(12) United States Patent
Singh et al.

(10) Patent No.: US 7,680,797 B1
(45) Date of Patent: Mar. 16, 2010

(54) METHODS AND SYSTEMS FOR PROVIDING A DATA ACCESS LAYER

(75) Inventors: Amit Singh, Irving, TX (US); Tao Yang, The Colony, TX (US); Fariborz Ebrahimi, Arlington, VA (US); Akash Jain, Irving, TX (US); Mohammad Azzam, Irving, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 869 days.

(21) Appl. No.: 10/897,744

(22) Filed: Jul. 23, 2004

Related U.S. Application Data

(60) Provisional application No. 60/489,988, filed on Jul. 25, 2003.

(51) Int. Cl.
*G06F 17/30* (2006.01)
(52) U.S. Cl. .......................... 707/10; 709/229; 711/118
(58) Field of Classification Search ................... 707/10; 709/229; 711/118
See application file for complete search history.

(56) References Cited

U.S. PATENT DOCUMENTS

| | | | | |
|---|---|---|---|---|
| 6,985,953 | B1 * | 1/2006 | Sandhu et al. | 709/229 |
| 7,117,504 | B2 * | 10/2006 | Smith et al. | 719/328 |
| 7,185,044 | B2 * | 2/2007 | Ryan et al. | 709/200 |
| 2002/0040352 | A1 * | 4/2002 | McCormick | 705/80 |
| 2004/0010502 | A1 * | 1/2004 | Bomfim et al. | 707/100 |
| 2004/0181513 | A1 * | 9/2004 | Henderson et al. | 707/3 |
| 2004/0236655 | A1 * | 11/2004 | Scumniotales et al. | 705/36 |
| 2005/0010547 | A1 * | 1/2005 | Carinci et al. | 707/1 |

OTHER PUBLICATIONS

K. Candan and W. Li, "Integration of Database and Internet Technologies for Scalable End-to-end E-commerce Systems", Idea Group Publishing, Jun. 7, 2002, pp. 84-112.*
K. Candan and W. Li, "Integration of Database and Internet Technologies for Scalable End-to-end E-commerce Systems" [http:/aria.asu.edu/candan/papers/06chap.pdf], *Idea Group Publishing*, 2003, pp. 84-112.
"Index of /candan/papers" [http:/aria.asu.edu/candan/papers], *downloaded on* Oct. 2, 2007.

* cited by examiner

*Primary Examiner*—Hosain T Alam
*Assistant Examiner*—Jieying Tang

(57) ABSTRACT

A preferred system for providing data access comprises an application program interface configured to delegate a request to at least one service providers also included in the system. The service providers may include a synchronization manager configured to maintain, based upon the request, data consistency between a first server containing the service providers and a second server and a cache manager configured to cache, based upon the request, a portion of a database query. In addition, the service providers may include a pre-fetch service configured to anticipate a database query, perform the anticipated query, and cache the results of the anticipated query, and a security manager configured to determine a restriction on the request based upon a role of a user associated with the request.

19 Claims, 4 Drawing Sheets

METHODS AND SYSTEMS FOR PROVIDING A DATA ACCESS LAYER

CROSS REFERENCE TO RELATED APPLICATIONS

This application claims the benefit of U.S. provisional application No. 60/489,988, filed Jul. 25, 2003, the disclosure of which is expressly incorporated herein by reference.

U.S. patent application Ser. No. 10/898,110, filed on even date herewith in the name of Amit Singh et al. and entitled METHODS AND SYSTEMS FOR PROVIDING CAPABILITY MANAGEMENT AND USER ADMINISTRATION and U.S. patent application Ser. No. 10/898,111, filed on even date herewith in the name of Tao Yang et al. and entitled METHODS AND SYSTEMS FOR PROVIDING DATA FORM MANAGEMENT, both assigned to the assignee of the present application, the disclosures of which are expressly incorporated herein by reference.

BACKGROUND INFORMATION

Each of the past three centuries has been dominated by a single technology. The eighteenth century included great mechanical systems ushering in the industrial revolution. The nineteenth century saw the steam engine's development. During the twentieth century, the key technology was information gathering, processing, and distribution. Other developments include worldwide telephone networks, radio and television, the birth and unprecedented growth in the computer industry, and communication satellites.

At the beginning of the twenty-first century, these areas are rapidly converging, and the differences between collecting, transporting, storing, and processing information are quickly disappearing. For example, enterprises with hundreds of offices spread over a wide geographical area routinely expect to inspect the current status of even their most remote office at the push of a button. As capabilities to gather, process, and distribute information grow, the demand for even more sophisticated information processing platforms grows faster.

One such sophisticated platform for building distributed enterprise applications is a Java 2 Platform, Enterprise Edition (J2EE) from Sun Microsystems. J2EE services are performed in a middle tier between a user's machine and an enterprise's databases and legacy information systems. J2EE comprises a specification, reference implementation, and set of testing suites. Its core components include, for example, Enterprise JavaBeans (EJBs), JavaServer Pages (JSPs), and Java servlets. Other Java 2 Platforms include Java 2 Platform, Standard Edition (J2SE) and Java 2 Platform, Micro Edition (J2ME).

EJBs provide a Java environment for developing and running distributed applications. EJBs are written as software modules that contain the business logic of the application. They reside in and are executed in a runtime environment called an "EJB Container," which provides a host of common interfaces and services to the EJB. There are three types of EJBs: i) session beans that can be used to perform processing; ii) entity beans that can be used to represent data, which can be a row or a table in a database, and iii) message driven beans that can be generated to process Java Messaging Service (JMS) messages. EJBs inherently provide future scalability and also allow multiple user interfaces to be used. For example, both a Web browser and a Java application could be used to access EJBs, or one could be switched for the other at a later date.

JSPs are an extension to the Java servlet technology that provides a simple programming vehicle for displaying dynamic content on a Web page. The JSP is a hypertext markup language (HTML) page with embedded Java source code that is executed in the Web server or application server. The HTML provides the page layout that will be returned to the Web browser, and the Java provides the processing, for example, to deliver a query to the database and fill in the blank fields with the results. The JSP is compiled into bytecode (into a servlet) when first encountered by the server.

Java servlets are Java applications that run in a Web server or application server and provide server-side processing, typically to access a database or perform e-commerce processing. Because they are written in Java, servlets are portable between servers and operating systems. The servlet programming interface (Java Servlet API) is a standard part of J2EE. If a Web server, such as Microsoft's Internet Information Server (IIS), does not run servlets natively, a third-party servlet plug-in can be installed to add the runtime support.

Most enterprise applications developed in Java need to access databases for data storage and retrieval. Furthermore, many of them need to implement cache mechanisms or other database query performance improvements, or need to implement security restrictions for the access to database data. Most applications implement independently what they need specifically for there applications and may also implement these features repeatedly in various components of the same application.

Thus, there is a need for improved systems and methods for providing a data access layer. For instance, there is a need to provide a data access layer to implement cache mechanisms or other database query performance improvements. Furthermore, there is a need for such improved systems and methods to allow applications to implement these features repeatedly in various components of the same application.

SUMMARY

In accordance with the current invention, a data access layer method and system are provided that avoid the problems associated with prior data access layer methods and systems as discussed herein above.

In one embodiment according to the present invention, a system for providing data access comprises an application program interface configured to delegate a request to at least one of the following service providers also included in the system, a synchronization manager configured to maintain, based upon the request, data consistency for shared data held in the memory of a first server and a second server, a cache manager configured to cache, based upon the request, a portion of a database query, a pre-fetch service configured to anticipate a database query, perform the anticipated query, and cache the results of the anticipated query, and a security manager configured to determine a restriction on the request based upon a role of a user associated with the request.

In another embodiment according to the present invention, a method for providing data access comprises delegating a request to at least one service provider included in a data access layer, maintaining data consistency between a first server containing the data access layer and a second server if the request is directed toward a synchronization manager, caching, based upon the request, a portion of a database query if the request is directed toward a cache manager, anticipating a database query, performing the anticipated query, and caching the results of the anticipated query if the request is directed toward a pre-fetch service, and determining a restriction on the request based upon a role of a user associated with the request if the request is directed toward a security manager.

In yet another embodiment according to the present invention, a computer-readable medium on which is stored a set of instructions for providing data access, which when executed perform stages comprising delegating a request to at least one service provider included in a data access layer, maintaining data consistency between a first server containing the data access layer and a second server if the request is directed toward a synchronization manager, caching, based upon the request, a portion of a database query if the request is directed toward a cache manager, anticipating a database query, performing the anticipated query, and caching the results of the anticipated query if the request is directed toward a pre-fetch service, and determining a restriction on the request based upon a role of a user associated with the request if the request is directed toward a security manager.

Both the foregoing general description of embodiments according to the present invention and the following detailed description thereof are exemplary and are intended to provide further explanation of the invention as claimed.

DETAILED DESCRIPTION OF PREFERRED EMBODIMENTS

Figure 1:
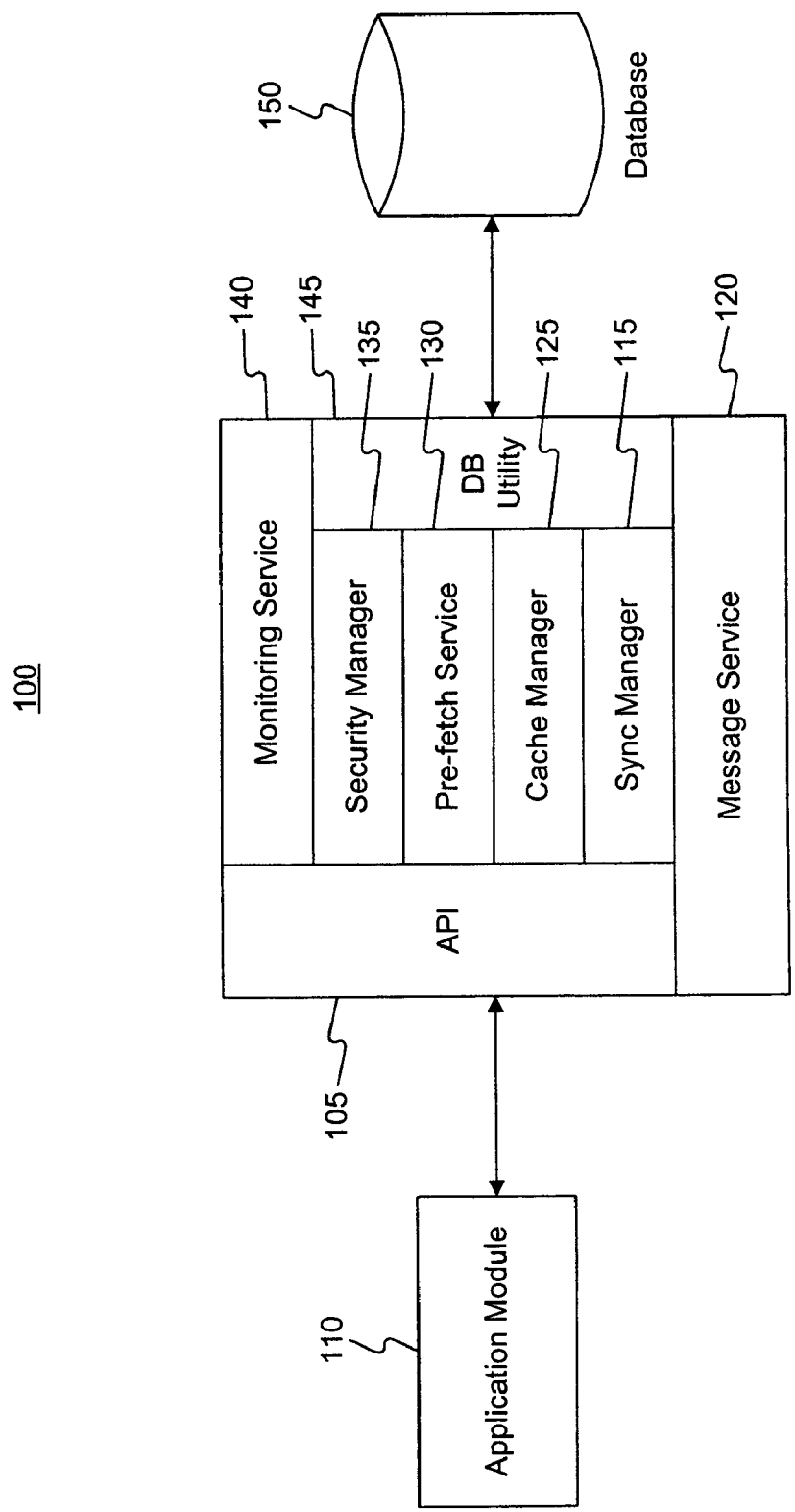
FIG. 1 is a functional block diagram of an exemplary system for providing a data access layer consistent with an embodiment of the present invention.

Reference will now be made to various preferred embodiments according to this invention, examples of which are shown in the accompanying drawings and described below. In the drawings, the same reference numbers represent the same or similar elements in the different drawings whenever possible.

Figure 4:
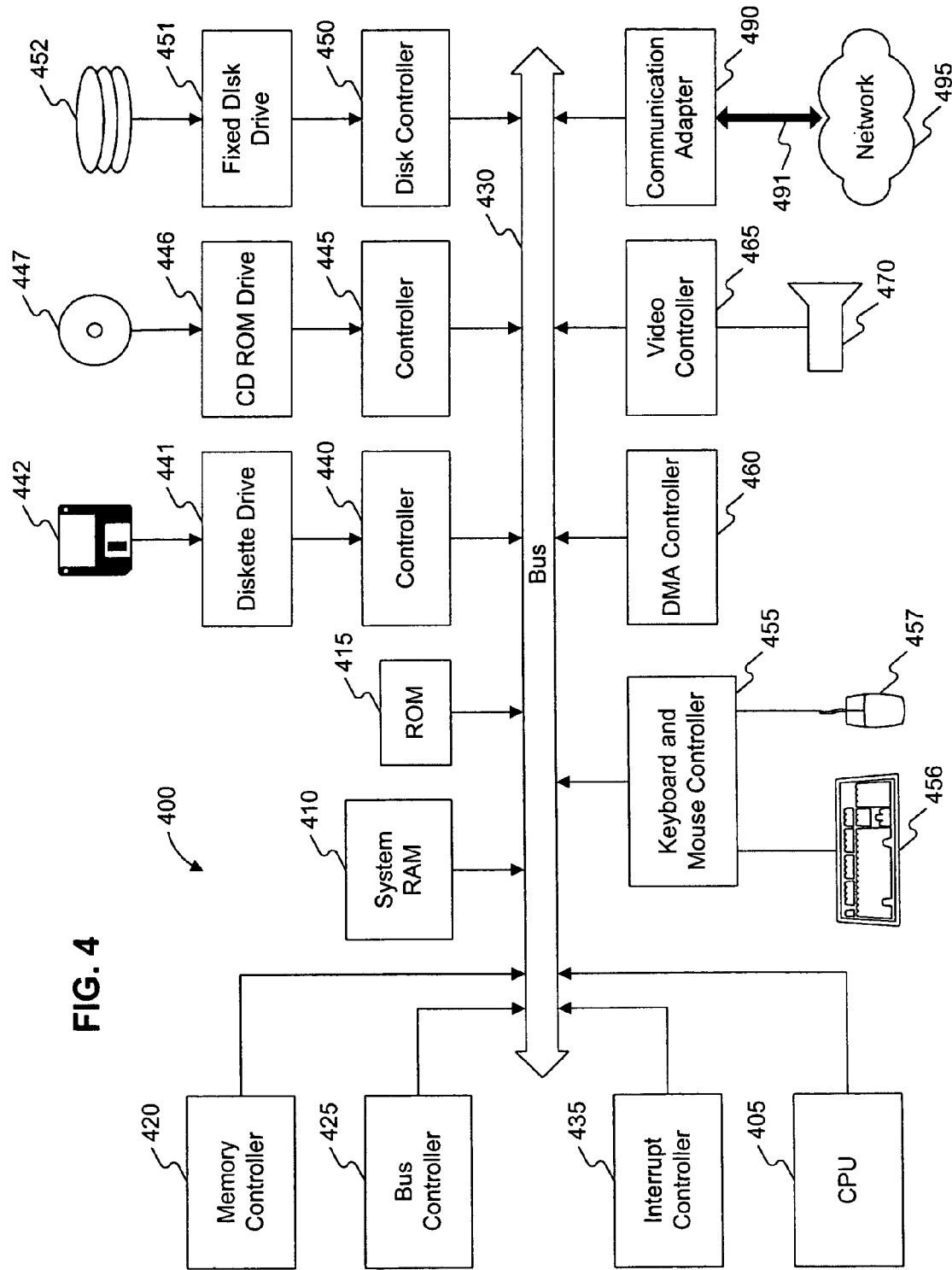
FIG. 4 is a functional block diagram of an exemplary computer system consistent with an embodiment of the present invention.

Consistent with an exemplary embodiment of the present invention, a system for providing data access may comprise an application program interface configured to delegate a request to at least one service provider also included in the system. The service providers may include a synchronization manager configured to maintain, based upon the request, data consistency between a first server containing the service providers and a second server, and a cache manager configured to cache, based upon the request, a portion of a database query. In addition, the service providers may include a pre-fetch service configured to anticipate a database query, perform the anticipated query, and cache the results of the anticipated query, and a security manager configured to determine a restriction on the request based upon a role of a user associated with the request. Consistent with an exemplary embodiment of the present invention, the aforementioned elements of the system for providing data access may comprise, be disposed, or implemented within a computer system 400, as shown in FIG. 4, as described below. Computer system 400 is exemplary and other devices and systems may comprise the aforementioned elements and still be consistent with embodiments of the present invention.

As herein embodied and illustrated in FIG. 1, the system for providing data access may comprise a data access layer (DAL) 100. Elements of a data access layer (DAL) 100 may comprise an application program interface (API) 105, an application module 110, a synchronization manager 115, a message service 120, a cache manager 125, a pre-fetch service 130, a security manager 135, a monitoring service 140, a database utility 145, and a database 150. Consistent with an exemplary embodiment of the present invention, the aforementioned exemplary elements comprising system 100 may comprise, be disposed, or implemented within a server 400, as shown in FIG. 4, as described below. Server 400 is exemplary and other devices and systems may comprise the aforementioned elements and still be consistent with embodiments of the present invention.

System 100 may comprise a fully re-usable "consolidated framework" for data management that any java-based enterprise application, for example, can use. System 100 may include a monolithic implementation of some functionalities that are commonly needed in Java-based enterprise applications, for example, including data access, such as cache mechanism, query performance improvement, and some unique features to help better control data access (retrieval, access, control and management). In most applications, these functionalities may be performed disjointedly using different libraries or products. Many enterprise applications developed in J2SE/J2EE, for example, may benefit from using system 100, since it may avoid substantial efforts to redevelop the same functionalities over and over again as well as centralizing various data and memory management tasks.

Many enterprise applications developed in J2SE/J2EE, for example, may need to perform functions including accessing a database for data storage and retrieval. Many of these applications may need to implement functions including a cache mechanism or other database query performance improvements, or may need to implement security restrictions for the access to database data. Many enterprise applications may include subprograms that implement these functions independently, and thus unnecessarily repeat these functions within the same application.

Consistent with embodiments of the present invention, system 100 may comprise a fully re-usable framework for data access that any Java-based enterprise application, for example, can use. System 100 may provide a uniform application programming interface, API 105, by which any Java application, for example, can access its features. Therefore, there may be no need to develop the same features repeatedly in separate applications, which generally requires substantial development effort.

Moreover, generic data access mechanisms may be centralized in system 100. Thus any code change for further improvement may be localized in this layer. Therefore, any improvement may benefit all application modules, application module 110 for example, using system 100. Furthermore, system 100 may implement some very useful and unique mechanisms. Such mechanisms may include synchronization manager 115 that may help maintain data coherence among a cluster of related servers or monitoring service 140 that may monitor the activity of "connection pools" that may help avoid running out of available connections because of unclosed connections.

Referring to FIG. 1, API 105 may comprise a common interface for application modules, such as other Java application components, to access system 100. API 105 may delegate requests to different service providers in system 100 such as security manager 135, pre-fetch service 130, cache manager 125, and synchronization manager 115. Database utility 145 may provide common functions to access database 150. Message service 120 may comprise a layer handling communications among servers, which may be used by synchronization manager 115. Monitoring Service 140 may monitor the state of system 100, and may provide periodic clean up or checkup.

Synchronization manager 115 may comprise a generic mechanism that may help to maintain data coherence among servers, in particular clustered servers. With respect to data coherence, some shared data may be present in the memory of clustered application servers in many enterprise applications. If the data is only updated in the memory of one server while other servers do not know about the update, this inconsistency of data in memory of multiple servers may cause problems. Instead of using database 150 for data synchronization, which may adversely affect performance, synchronization manager 115 receives update notification from one server where the update occurs and propagates the detailed update information to all other interested servers, so that other servers may refresh their data in memory directly. Message service 120 may comprise a transport layer responsible for propagating the update information among servers.

Cache manager 125 may cache database query results for display and later repeated retrieval. For example, when an enterprise application performs a database query and displays the result on a browser, it usually displays only the first page because of a huge returned database query result. Cache manager 125 may cache the several pages (caller specified or default number of pages) of query results adjacent to the page being displayed, thus no database query may be repeated when a user selects to view the next or previous pages. Another way of caching is to cache the database query result with an expiration time. In this way, the query result can be provided to any user who requests it until the expiration time passes. Once it expires, the database query may need to be performed again. This may be useful in the situation where the query result remains unchanged for a period, for instance, non-real-time reports that are updated only periodically. In order to conserve memory, cache manager 125 may remove old entries in cache when needed or requested.

Pre-fetch service 130 provides the capability to run database queries in the background and to cache the results even before it is requested to do so. In this way the query result may be returned more quickly when it is requested. This can be particularly useful when the application returns a page of query results to the user on the browser and there is a good chance that the user will click on a hyperlink on the page again, which would incur another database query.

Security manager 135 may maintain data access control based on roles. A role may comprise an abstraction of a user group where the users have the same permission to access system functionalities or application user data. When a data access request is passed to application module 110 from a user, the request may be delegated to system 100, under the scrutiny of security manager 135. Based on the current role of the user, security manager 135 may determine the restriction on the requested data access, and then may choose to grant, decline, or revise the request.

Monitoring service 140 may monitor the state of system 100 and provide a performance matrix in the form of logs and reports, for example. It also may include running threads to perform periodic clean-ups or health checks. A typical running thread may comprise a thread monitoring the requests for database connections from a connection pool maintained by an application server. One problem may arise when application module 110 requests database connections from the connection pool for database access, but fails to return the used connection back to the pool. In this case, eventually all connections are taken. Thus, no connections may be available for uses, which may result in the application's failure. In system 100, the requests and usage of database connections may be recorded, thus allowing monitoring service 140 to periodically check the state. Furthermore, the monitoring service 140 may send notifications when connections are nearly running out and close connections that have been idle for a long time to save the application. Monitoring service 140 may also provide performance metrics on the usage of database connections and other database resources.

Figure 2:
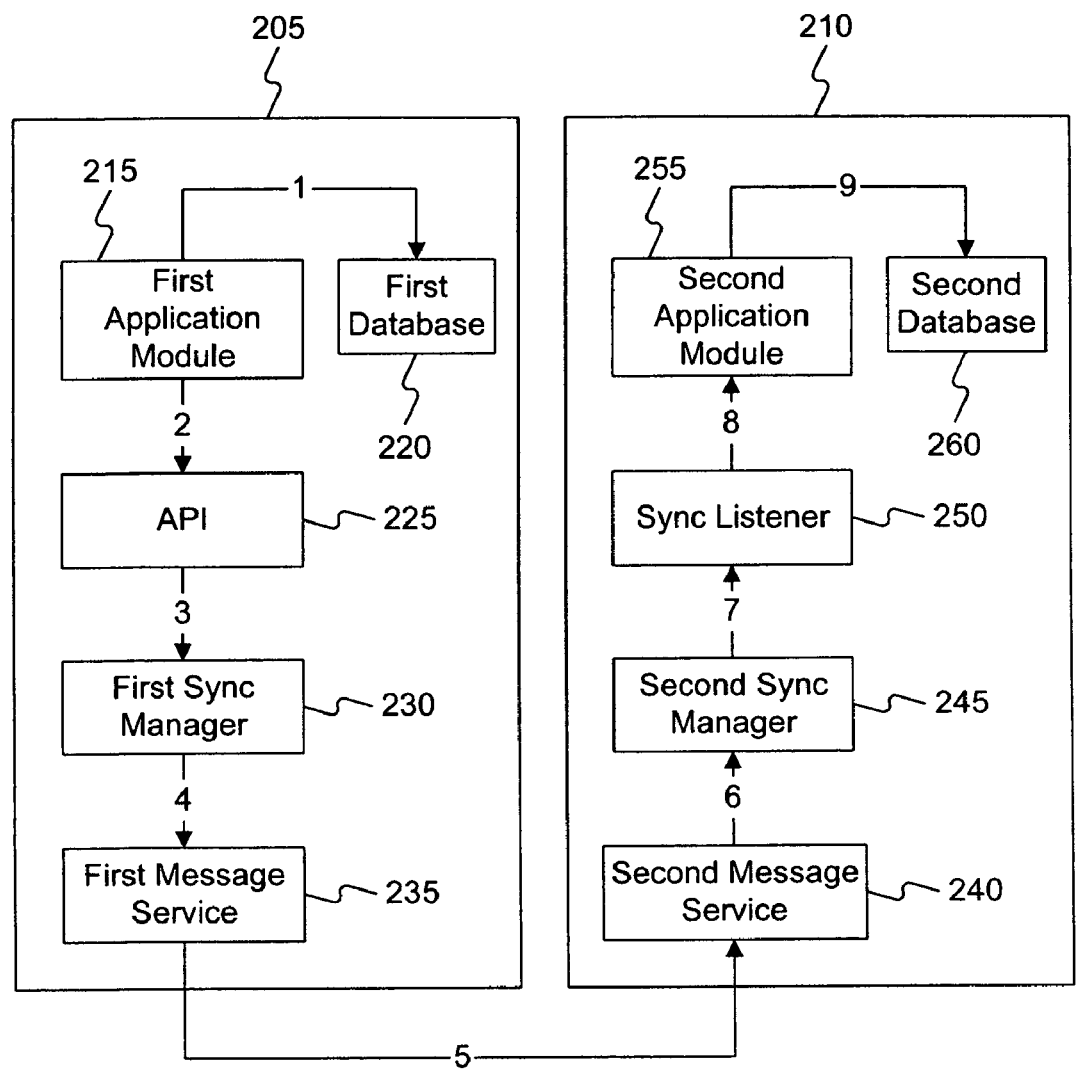
FIG. 2 is a state diagram of an exemplary method for updating a copy of shared data consistent with another embodiment of the present invention.

FIG. 2 is a state diagram illustrating the general stages involved in exemplary method for updating a copy of shared data. The implementation of the stages of this exemplary method in accordance with an exemplary embodiment of the present invention will be described in greater detail below. The method begins with a first server 205 where a first application module 215, for example, updates a first database 220 with shared data between first server 205 and a second servers 210. (State 1.) Next, first application module 215 accesses a first API 225, providing a request comprising detailed information for data update propagation. (State 2.) First API 225 then delegates the request to a first synchronization manager 230. (State 3.) First synchronization manager 230 then constructs a message and passes it to first message service 235. (State 4.) First message service 235 of first server 205 communicates with a second message service 240 on second server 210 and passes the message to second message service 240. (State 5.) Next, second message service 240 retrieves the request from the message and decides, based on an event model, whether to pass the request to a second synchronization manager 245. (State 6.) Second synchronization manager 245 passes the data update request to a second sync listener 250 that may comprise an appropriate sync listener class, for example, provided by a Java component. (State 7.) Second sync listener 250 notifies a second application module 255 to processes the data update request appropriately, (State 8) including, for example updating a copy of shared data in a second database 260. (State 9.)

Figure 3:
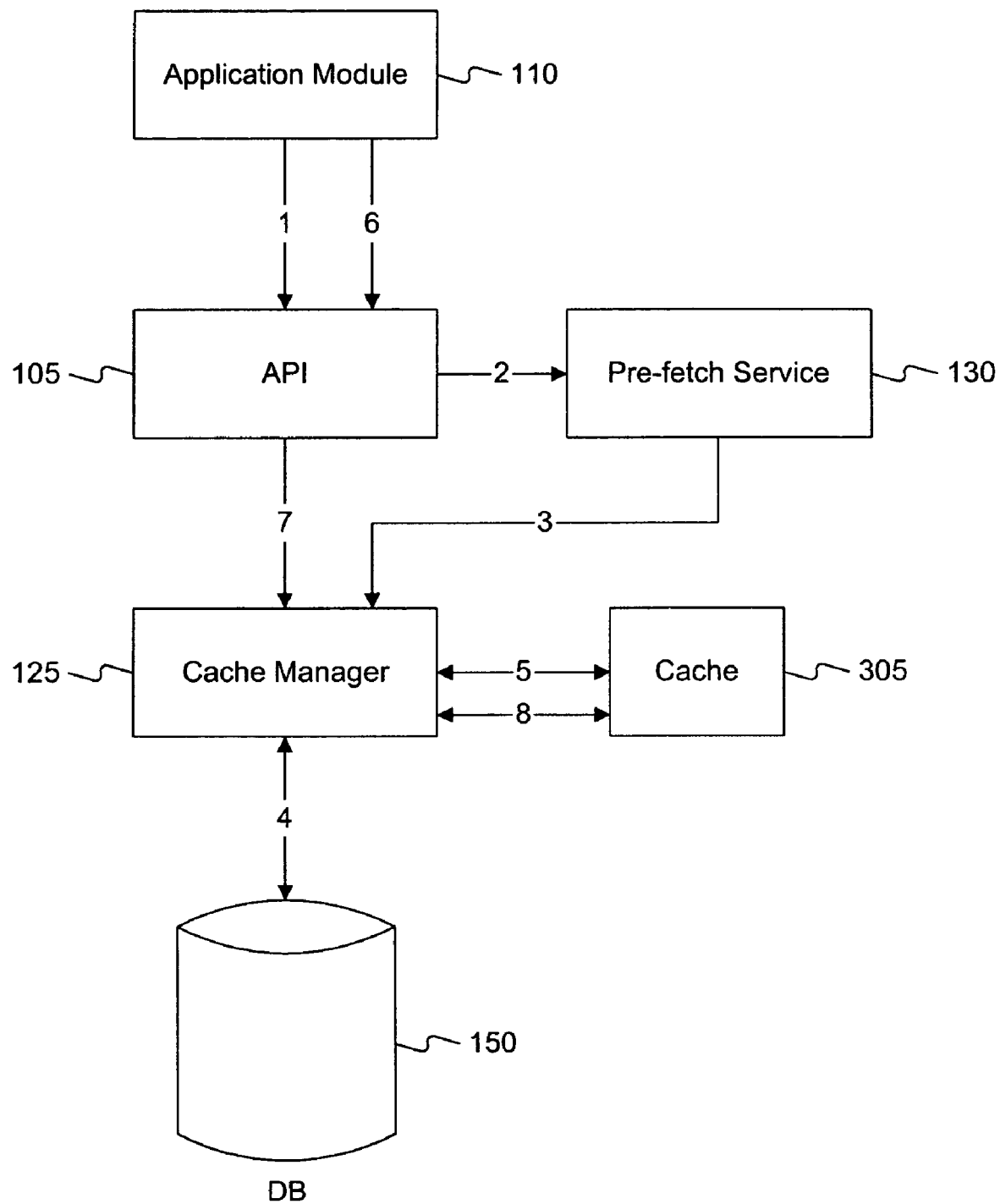
FIG. 3 is a state diagram of an exemplary method for using a cache manager consistent with another embodiment of the present invention.

FIG. 3 is a state diagram illustrating the general stages involved in exemplary method for using cache manager 125. The implementation of the stages of this exemplary method in accordance with an exemplary embodiment of the present invention will be described in greater detail below. The method begins with application module 110 handling a user's request. Application module 110 may predict that the user's next click, for example, may initiate another database query. Consequently, application module 110 may send that database query as a pre-fetch request to API 105 in advance. (State 1.) As a result, API delegates a pre-fetch request to pre-fetch service 130. (State 2.) Next, pre-fetch service 130 may pass the database query request to cache manager 125 with other detailed control information including, for example, an indication that the query result should be stored into cache, but with a short expiration time. (State 3.) Cache manager 125 receives the database query result from database 150. (State 4.) Next cache manager 125 stores the result and its associated database query in cache 305. (State 5.) Later, if the user clicks on an expected link, then application module 110 handling the request may send the associated database query to API 105. (State 6.) API 105 passes the database query request to cache manager 125. (State 7.) Cache manager 125 may find the results from cache 305 and return them more quickly than the results had not been pre-fetched. (State 8.) Whether the user clicks on the expected link or not, the result may expire in cache very quickly in order to conserve memory.

As herein embodied and illustrated in FIG. 4 is a diagram of a system architecture for a computer system 400 with which the invention may be implemented. Consistent with an exemplary embodiment of the present invention, servers, as described above including, server 205 and 210, may comprise, be disposed, or implemented within computer system 400. Although the description may refer to terms commonly used in describing particular computer systems, such as a personal computer, the description and concepts equally apply to other computer systems, such as network computers, workstations, and even mainframe computers having architectures dissimilar to FIG. 4.

Computer system 400 includes a central processing unit (CPU) 405, which may be implemented with a conventional microprocessor, a random access memory (RAM) 410 for temporary storage of information, and a read only memory (ROM) 415 for permanent storage of information. A memory controller 420 controls the RAM 410.

A bus 430 interconnects the components of computer system 400. A bus controller 425 controls the bus 430. An interrupt controller 435 receives and processes various interrupt signals from the system components.

Mass storage may be provided by diskette 442, CD ROM 447, or hard drive 452. Data and software may be exchanged with computer system 400 via removable media such as diskette 442 and CD ROM 447. Diskette 442 inserts into diskette drive 441 which, in turn, connects to bus 430 via a controller 440. Similarly, CD ROM 447 inserts into CD ROM drive 446 which, in turn, connects to bus 430 via controller 445. Hard disk 442 is part of a fixed disk drive 441 that connects to bus 430 by controller 440.

User input to computer system 400 may be provided by a number of devices. For example, a keyboard 446 and mouse 447 connect to bus 430 via controller 444. In addition, other input devices, such as a pen, a tablet, or speech recognition mechanisms, may connect to bus 430 and an appropriate controller and software. A direct memory access (DMA) controller 460 performs direct memory access to RAM 410. User output may be generated by a video controller 464 that controls video display 470.

Computer system 400 also includes a communications adaptor 490 that allows the system to be interconnected to additional computing resources via a local area network (LAN) or a wide area network (WAN), such as the Internet, schematically illustrated by bus 491 and network 495. Signals traveling through network 495 can generally be referred to as "carrier waves" that transport information. Although aspects of the embodiments are herein described as being stored in memory in the form of instructions, those aspects may be stored on other computer-readable media, such as secondary storage devices like hard disks, floppy disks, or CD ROM, or other forms of RAM or ROM, or a carrier wave.

Operation of computer system 400 is generally controlled and coordinated by operating system software. The operating system controls allocation of system resources and performs tasks, such as memory management, process scheduling, networking, and services, among other things.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. Other embodiments of the invention will be apparent to those skilled in the art from consideration of the specification and practice of the embodiments disclosed herein. It is intended that the specification and examples be considered as exemplary only, with a true scope of the invention being indicated by the following claims.

What is claimed is:

1. A system for providing a re-usable data access framework, the system comprising:
   first and second application modules generating requests for information; and
   a data access layer, including a first server that includes an application program interface and a plurality of service providers, the application program interface configured to:
      receive a request from the first application module, and
      delegate the request to at least one of the plurality of service providers to manage data associated with the request,
   wherein the plurality of service providers comprise:
      a synchronization manager configured to:
         maintain, in response to a determination that the request is an update shared data request for updating the shared data, data consistency for shared data held in a memory of the first server and a memory of a second server and
         send information associated with the update shared data request to the second application module from a first message service provider located in the first server to a second message service provider located in the second server;
      a cache manager configured to:
         cache results of a first database query in response to the request being a database access request, and
         provide a portion of the results of the first database query to one of the first or second application modules in response to receipt of a second database query from one of the first or the second application modules;
      a pre-fetch service configured to cause the cache manager to:
         perform a third database query in response to the first or the second application module predicting a user action,
         cache results of the third database query, and
         provide the results of the third database query to the application program interface when the user action is received by the one of the first or the second application modules; and
      a security manager configured to determine a restriction on the request based upon a role of a user associated with the request.

2. The system of claim 1, wherein at least one of the first or second application modules executes instructions using the Java programming environment.

3. The system of claim 1, wherein the pre-fetch service causes the data to be pre-fetched from the database and stored in cache for future requests.

4. The system of claim 1, wherein the cache manager causes the portion of the database query results that resides in the cache to expire after a first period of time.

5. The system of claim 1, wherein the user action sends data from a hyperlink identified in the request.

6. The system of claim 1, wherein the restriction comprises one of a granted request, a declined request, and a revised request.

7. The system of claim 1, wherein the plurality of service providers further comprise a monitoring service, the monitoring service being configured to:
   monitor a plurality of connections between the first server and the database and
   close a first connection within the plurality of connections if the first connection is idle for greater than a second period of time.

8. The system of claim 1, further comprising a database utility configured to provide database access to the service providers.

9. The system of claim 1, wherein the system comprises a layer, located between an application server and a database server, which centralizes data access and management-related activities.

10. A method for providing a re-usable data access framework, the method comprising:
   receiving a request from at least one of first and second application modules by a data access layer having an application program interface located in a first server;
   delegating the request to at least one of a plurality of service providers, located in the first server, to manage data associated with the request;
   maintaining, using at least one of the plurality of service providers in response to a determination that the request is an update shared data request for updating the shared data, data consistency for shared data held in a memory of the first server and a memory of a second server;
   sending information associated with the request to the second application module from a first message service provider located in the first server to a second message service provider located in the second server;
   caching results of a first database query, using at using at least one of the plurality of service providers, in response to a determination that the request is a database access request for updating;
   providing a portion of the results of the first database query to one of the first or second application module in response to receiving a second database query from one of the first or the second application module;
   causing at least one of the plurality of service providers to:
      perform a third database query in response to the first or the second application module predicting a user action,
      cache results of the third database query, and
      provide the results of the third database query to the application program interface when the user action is received by one of the first or the second application module; and
   determining a restriction on the request based upon a role of a user associated with the request if the request is received by a third service provider of the plurality of service providers.

11. The method of claim 10, wherein at least one of the first or second application modules executes instructions using the Java programming environment.

12. The method of claim 10, wherein the pre-fetch service causes data to be pre-fetched from the database and stored in cache for future requests.

13. The method of claim 10, wherein the cache manager causes the portion of the database query results that resides in the cache to expire after a first period of time.

14. The method of claim 10, wherein the user action sends data from a hyperlink identified in the request.

15. The method of claim 10, wherein the restriction comprises one of a granted request, a declined quest, and a revised request.

16. The method of claim 10, further comprising:
   monitoring a plurality of connections between the first server and the database; and
   closing a first connection within the plurality of connections if the first connection is idle for greater than a second period of time.

17. The method of claim 10, further comprising providing database access through a database utility.

18. The method of claim 10, wherein the method provides a layer, located between an application server and a database server, which centralizes data access and management-related activities.

19. A computer-readable storage medium on which is stored a set of instructions for providing a re-usable data access framework, which when executed, perform stages comprising:
   receiving a request from at least one of first and second application modules by a data access layer having an application program interface located in a first server;
   delegating the request to at least one of a plurality of service providers, located in the first server, to manage data associated with the request;
   maintaining, using at least one of the plurality of service providers in response to a determination that the request is an update shared data request for updating the shared data, data consistency for shared data held in a memory of the first server and a memory of a second server;
   sending information associated with the request to the second application module from a first message service provider located in the first server to a second message service provider located in the second server;
   caching results of a first database query, using at using at least one of the plurality of service providers, in response to a determination that the request is a database access request for updating;
   providing a portion of the results of the first database query to one of the first or second application module in response to receiving a second database query from one of the first or the second application module;
   causing at least one of the plurality of service providers to:
      perform a third database query in response to the first or the second application module predicting a user action,
      cache results of the third database query, and
      provide the results of the third database query to the application program interface when the user action is received by one of the first or the second application module; and
   determining a restriction on the request based upon a role of a user associated with the request if the request is received by a third service provider of the plurality of service providers.

* * * * *